Feb. 19, 1952    R. S. PAGE    2,586,559
MULTIPLE ELEMENT ELECTRON LENS ARRANGEMENT
Filed Dec. 18, 1950
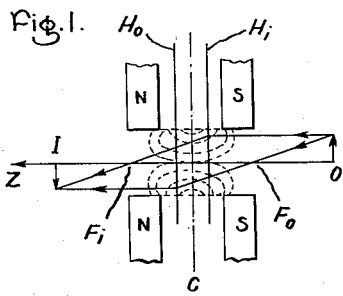
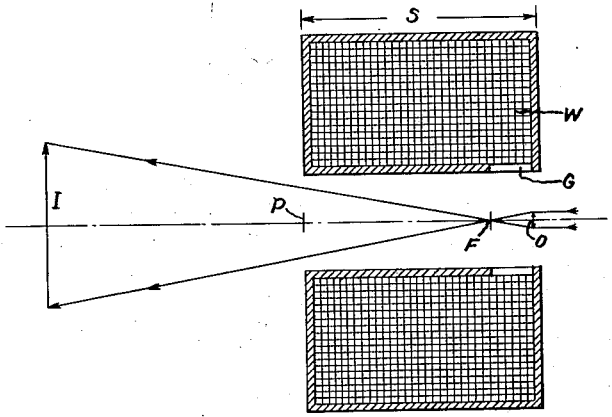
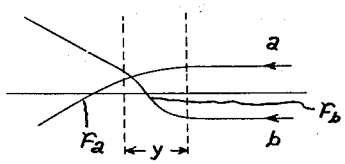
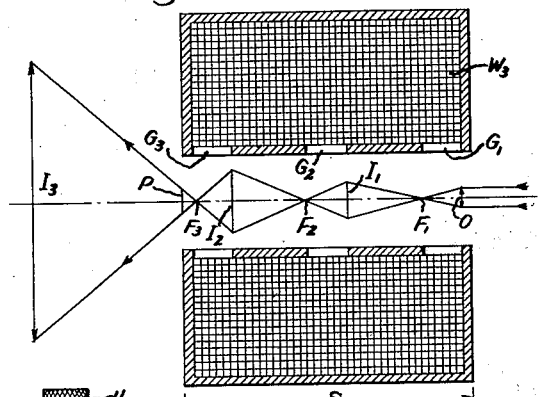
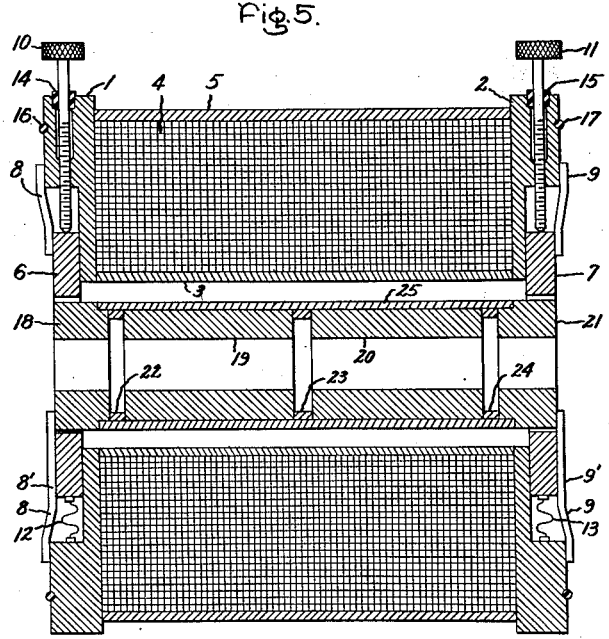
Inventor:
Richard S. Page,
by Paul A. Frank
His Attorney.

Patented Feb. 19, 1952

2,586,559

UNITED STATES PATENT OFFICE 2,586,559

MULTIPLE ELEMENT ELECTRON LENS ARRANGEMENT

Richard S. Page, Stretford, Manchester, England, assignor to General Electric Company, a corporation of New York Application December 18, 1950, Serial No. 201,270
In Great Britain February 23, 1950

4 Claims. (Cl. 313—84)

This invention relates to magnetic electron lenses such as are used for focusing electron beams in electron microscopes and diffraction cameras. Such lenses as used hitherto have been constituted by an axially symmetrical magnetic field which may be produced between two spaced annular magnetic poles excited from a source of magnetomotive force, usually an electromagnet.

The improved lens of the present invention comprises a plurality of lens elements which are excited in series from a common source of magnetomotive force. The lens elements are comparatively closely spaced in relation to the overall stage length of the lens system and, in practice, a lens some thirty times more powerful than a single stage lens of equal length may be obtained. Moreover, as a projector lens in an electron microscope, the improved lens enables the high magnification of the known long single element type lens to be obtained in a comparatively short and rigid construction.

The features which I desire to protect herein are pointed out with particularity in the appended claims. The invention itself, together with further objects and advantages thereof, may best be understood by reference to the following description taken in connection with the accompanying drawing, in which:

Figs. 1 and 2 are explanatory diagrams showing the operation of an electron lens, Fig. 3 shows diagrammatically a lens of normal construction, such being useful in explaining the present invention, Fig. 4 shows diagrammatically a lens constructed in accordance with this invention, and Fig. 5 shows the constructional arrangement of one form of lens in accordance with this invention.

An axially symmetrical magnetic field, for instance the field generated by the magnetic poles N, S shown in Fig. 1, is used as a lens in electron optics for focusing beams of electrons. To a first approximation such lenses follow the laws of geometrical optics and are equivalent to a spherically uncorrected, simple convex glass lens in light optics.

An approximate formula for the focal length $f$ of a magnetic lens is $$\frac{1}{f} = \frac{e/m}{8V} \int_{-\alpha}^{\alpha} h_z^2 dz \qquad (1)$$

where $e/m$ is the ratio of electronic charge to mass, $V$ is the voltage through which the electrons have been accelerated, and $h_z$ is the axial component of the magnetic field. The integration is carried out along the lens axis. Assuming $V$ is constant, it will be seen that the focal length can be reduced by increasing the strength of the magnetic field. There is, however, a limit to this procedure. In Fig. 1 a well known construction is shown for obtaining the image I of an object O. Here $H_o$ and $H_i$ are the principal planes, $F_o$ and $F_i$ are the focal points and C is the plane of symmetry of the lens. In practice, the paths of the electrons are curves through the lens field as shown in Fig. 2. For the ray $a$ the strength of the field is assumed such that the focal point $F_a$ lies outside the field; if, however, we increase the field strength to reduce $f$ according to Equation 1, a point is reached when the focal point lies within the field. This is the case for ray $b$, which has focal point $F_b$, so that the ray is still within the field after crossing the lens axis and is, therefore, refracted towards the axis again until it leaves the field. This reduces the refractive power of the lens. There is thus a maximum refractive power obtained when the focal length is approximately equal to half the axial extent Y of the magnetic field.

If such a lens is used as a projector in an electron microscope, the magnification obtainable will exhibit a maximum as the lens excitation increases. The effect can be counteracted by reducing the axial extent of the field while increasing the field strength, but again there is a limit. To reduce the axial extent of the field, it is necessary not only to reduce the gap between the poles but also the axial bore through them. The minimum value of this bore is fixed, in practice, by the maximum magnification required from the projector lens and the size of the undistorted image field. Therefore, a definite maximum stage magnification is assumed for a given set of conditions.

In a single stage of magnification the ratio of maximum magnification to minimum undistorted magnification is approximately 4:1. Thus, if conditions are chosen so that the minimum magnification of an electron microscope with one projector lens is to be 5,000 times, then the maximum will be about 20,000 times. To extend this range it is now common practice to add a second projector lens to the apparatus and then the range of magnification is raised to about 100:1. The improved lens of the present invention, as described herein, enables a range of approximately 10:1 to be obtained with a multi-element lens occupying the same space as a single element type.

A cross section through the axis of a conventional single lens projector stage is shown schematically in Fig. 3; the solenoidal winding W is surrounded by an iron circuit with an axial gap G forming a lens as in Fig. 1. The overall length of the lens assembly is S. An object at O, which may be an electron image formed by a previous lens (not shown), is enlarged to form a final image at I where the fluorescent screen or photographic plate is located. It is assumed that distance $IP=x$ is fixed by considerations such as the size of final image and the arrangements for viewing the image, etc. The focal length $f$ is assumed to be the minimum value so that the maximum stage magnification $M_1$ is given by $$M_1 = \frac{IF}{OF} = \frac{v}{f} = \frac{x+(S-f)}{f} \quad (2)$$

where $v$ equals the perpendicular distance from the focal point F to the plane of image I.

Considering now a lens in accordance with this invention as shown in Fig. 4, the iron circuit of the lens is provided with three non-magnetic gaps $G_1$, $G_2$ and $G_3$, instead of the one gap G in Fig. 3. The excitation of the solenoidal lens winding $W_3$ is increased until each of the three identical lenses so formed has the minimum focal length $f$. The dimensions $x=IP$ or $I_3P$, $L=OI$ or $OI_3$, and S are assumed to be identical with the previous case.

The maximum magnification $M_2$ is then given by $$M_2 = \frac{(v_2)}{(f)}\frac{(v_2)}{(f)}\frac{(x)}{(f)} = \frac{xv_2^2}{f^3} = \frac{x}{f^3}\frac{(S-3f)_2}{(2)} \quad (3)$$

To illustrate the gain in magnification by using the multi-gap lens, we shall insert practical values for the quantities in Equations 2 and 3. These are $x=30$ cms., $S=8$ cms., and $f=.3$ cm.

We then have $$M_1 = \frac{30+(8-.3)}{.3} = 125$$

and $$M_2 = \frac{30}{.3^3}\frac{(8-.9)^2}{4} \cong 14000$$

If we consider an electron microscope with an objective lens focal length of 0.4 cm. and a single projector lens, as shown in Fig. 3, which is required to give an overall magnification of, say, 20,000 times, then the length of the objective stage will be $$\frac{20000}{125} \times .4 = 64 \text{ cms.}$$

The overall length of the microscope would then be $64+38=102$ cms. from object to screen, 38 cms. being the length $S+x$ (30+8 cms.) of the conventional microscope projector stage.

With the multi-gap lens the objective stage length would be $$\frac{20000}{14000} \times .4 = .57 \text{ cm.}$$

giving an overall length of $38+.57 \cong 38\frac{1}{2}$ cms.

The multi-gap lens is not restricted to the use of three gaps; this number is convenient in practice but two, four or more may be used depending on the characteristics required. Further analysis reveals that there is an optimum number of gaps for a given length S of the lens and a given minimum focal length $f$. For a value of $S=8$ cms. the optimum number of gaps is 5 with a focal length of .4 cm.

The minimum stage magnification is determined practically by the physical bore of the lens gaps and the size of the final image required. To avoid pincushion distortion of the image, it is necessary that only the zone near the axis of the lens should be employed, the diameter of this zone being not greater than one-fourth of the lens bore diameter. Therefore, if the diameter of the final image is D, the diameter of the image $I_2$ (Fig. 4) is $$D\frac{(f)}{(x)}$$

and the clear diameter $d$ of the poles must be $$\frac{4Df}{x}$$

to avoid distortion. If $d$ is fixed by the requirements of high magnification, then the minimum magnification of the last stage of the multi-gap lens is given by $$M^1_{min} = \frac{4D}{d}$$

The value of the focal length will then be $$f_{max} = \frac{x}{M^1_{min}} = \frac{xd}{4D} \quad (4)$$

Substituting this value of $f$ in Equation 3 we obtain for the minimum overall magnification $$M_{min} = \frac{16D^3}{x^2d^3}\left[S - \frac{3xd}{4D}\right]^2 \quad (5)$$

The value of $d$ corresponding to the previously quoted practical values is approximately equal to 0.5 cm. and if $D=6$ cms., then we have $$M_{min} = \frac{16.6^3}{30^2(.5)^3}\left[8 - \frac{3.30(.5)}{4.6}\right]^2 \cong 1150$$

This gives a magnification range with a ratio of $$\frac{14,000}{1,150} = \frac{12}{1}$$

The limiting values of the magnification range are determined by choosing suitable value for the lens bore diameters.

To apply such a lens in high resolution electron diffraction, the ray shown in Fig. 4 may be considered to be reversed. If it is assumed that $I_3$ is an electron source such as the filament or crossover of an electron gun, then $I_2$ is a demagnified image, $I_1$ is a further demagnified image and O the final image. Using the practical values already quoted, the image O will be demagnified 14,000 times and can then be used as a small source of electrons. A typical size for an electron source produced by conventional high voltage electron guns is about 50 microns in diameter. The reduced source would then have a diameter of $$\frac{50}{14,000}$$

microns or 36 angstrom units, this reduction being obtained in a distance of about 40 cms.

The construction of one form of a complete multi-gap lens unit according to this invention is shown in Fig. 5. The main part consists of two iron flanges 1, 2 which are soldered to a tube 3 made of a non-ferrous metal or stainless steel. The exciting winding 4, which may be energized by a suitable source of direct current (not shown), is wound on the bobbin formed by the parts 1, 2 and 3 and is covered by the tubular steel shroud 5.

The outer faces of the flanges 1 and 2 are turned out to contain the annular rings 6 and 7, which are made of iron and held in position by the sets of leaf springs 8 and 9. The position of the rings 6 and 7 with respect to the lens axis can be varied by turning the threaded push rods 10, 11. The rings 6 and 7 are respectively held in contact with the push rods by compression springs 12 and 13. The two push rods 10, 11 are provided at each end of the lens to allow motion in two directions at right angles. The push rods are vacuum sealed by rubber glands 14 and 15, while the lens unit may be sealed to the adjacent parts of the apparatus (not shown) by rubber rings 16 and 17 set in grooves in the walls of flanges 1 and 2 respectively.

The poles of the multi-gap lens are formed by hollow cylindrical iron pole pieces 18, 19, 20 and 21, coaxially aligned and spaced by the non-magnetic rings 22, 23 and 24. These are all a push fit in the non-magnetic tube 25 which is used to hold the pole pieces with their axes in accurate alignment. The end pole pieces 18 and 21 are a loose fit in the inner bore of the rings 6 and 7 and the pole assembly is held in axial position by extensions 8' and 9' on the leaf springs 8 and 9, respectively.

The path of the magnetic flux generated by winding 4 is thus confined to the iron circuit comprising flange 1, tube 5, flange 2, ring 7, pole pieces 18, 19, 20 and 21 and ring 6. The flux crosses the gaps 22, 23, 24 and fringes into the central bore so producing an electron lens at each gap.

The common axis of the pole pieces can be aligned with the fixed axis of the associated apparatus by adjusting the position of the end rings 5 and 7 through push rods 10 and 11.

What I claim as new and desire to secure by Letters Patent of the United States, is:

1. A multiple element magnetic electron lens comprising an annular exciting winding having a central bore defined by a tubular member of non-magnetic material, a plurality of magnetic pole pieces positioned in spaced apart and end to end relationship in said bore, said pole pieces having coaxially aligned central bores, a plurality of non-magnetic spacer rings each of which is positioned between the two adjacent ends of each pair of said pole pieces to form a series of non-magnetic gaps across which magnetic flux will fringe and produce a multiple element magnetic electron lens when said exciting winding is energized, said pole pieces and said rings being enclosed by a non-magnetic tubular section having an outside diameter less than the diameter of the central bore of said exciting winding to form a pole piece assembly capable of being adjusted as a unit within the central bore of said exciting winding.

2. A multiple element magnetic electron lens comprising an annular exciting winding having a central bore defined by a tubular member of non-magnetic material, a plurality of magnetic pole pieces positioned in spaced apart and end to end relationship in said bore, said pole pieces having coaxially aligned central bores, a plurality of non-magnetic spacer rings each of which is positioned between the two adjacent ends of each pair of said pole pieces to form a series of non-magnetic gaps across which magnetic flux will fringe and produce a multiple element magnetic electron lens when said exciting winding is energized, said pole pieces and said rings being enclosed by a non-magnetic tubular section having an outside diameter less than the diameter of the central bore of said exciting winding to form a unitary pole piece assembly, the pole pieces terminating said assembly at each end being extended beyond the corresponding ends of said tubular section and said annular exciting winding, magnetic adjustment rings encircling the extension of each of said pole pieces terminating said assembly, and means for altering the position of said adjustment rings to adjust said pole piece assembly within the bore of said exciting winding.

3. A multiple element magnetic electron lens comprising an annular exciting winding having a central bore defined by a tubular member of non-magnetic material, a plurality of magnetic pole pieces positioned in spaced apart and end to end relationship in said bore, said pole pieces having coaxially aligned central bores, a plurality of non-magnetic spacer rings each of which is positioned between the two adjacent ends of each pair of said pole pieces to form a series of non-magnetic gaps across which magnetic flux will fringe and produce a multiple element magnetic electron lens when said exciting winding is energized, said pole pieces and said rings being enclosed by a non-magnetic tubular section having an outside diameter less than the diameter of the central bore of said exciting winding to form a unitary pole piece assembly, the pole pieces terminating said assembly at each end being extended beyond the corresponding ends of said tubular section and said annular exciting winding, magnetic adjustment rings encircling the extension of each of said pole pieces terminating said assembly, means for vacuum sealing said exciting winding, said pole piece assembly and said adjustment rings into a vacuum system, and externally operable vacuum sealed means for altering the position of said adjustment rings to adjust said pole piece assembly within the bore of said exciting winding.

4. A multiple element magnetic electron lens comprising an annular exciting winding having a central bore, a plurality of magnetic pole pieces positioned in said bore and having coaxially aligned central bores, said pole pieces being axially spaced apart to provide a series of axially equidistant non-magnetic gaps across which magnetic flux may fringe and produce a series of identical magnetic lenses, and means for energizing said exciting winding to produce a desired amount of fringing magnetic flux, said desired amount being such that each of said magnetic lenses will have a minimum focal length.

RICHARD S. PAGE.

REFERENCES CITED

The following references are of record in the file of this patent:

UNITED STATES PATENTS

| Number | Name | Date |
|---|---|---|
| 2,369,782 | Hillier | Feb. 20, 1945 |
| 2,369,796 | Ramberg | Feb. 20, 1945 |
| 2,418,349 | Hillier et al. | Apr. 1, 1947 |
| 2,438,971 | Hillier | Apr. 6, 1948 |
| 2,472,315 | Reisner | June 7, 1949 |
| 2,503,173 | Reisner | Apr. 4, 1950 |